US00RE34608E

United States Patent [19]

Hufgard

[11] E Patent Number: Re. 34,608

[45] Reissued Date of Patent: May 17, 1994

[54] PAINT SPRAY GUN

[75] Inventor: John W. Hufgard, Novelty, Ohio

[73] Assignee: AccuSpray, Inc., Cleveland, Ohio

[21] Appl. No.: 864,484

[22] Filed: Apr. 7, 1992

Related U.S. Patent Documents

Reissue of:

[64] Patent No.: 4,915,303
Issued: Apr. 10, 1990
Appl. No.: 297,128
Filed: Jan. 17, 1989

U.S. Applications:

[63] Continuation-in-part of Ser. No. 101,563, Sep. 28, 1987, Pat. No. 4,905,905.

[51] Int. Cl.[5] ..... B05B 1/28

[52] U.S. Cl. ..... 239/300; 239/290; 239/526

[58] Field of Search ..... 239/290, 296, 297, 299, 239/300, 301, 525, 526, 527; 251/309, 321; 403/381, 388

[56] References Cited

U.S. PATENT DOCUMENTS

| | | | |
|---|---|---|---|
| 1,608,833 | 11/1926 | Birkenmaier et al. . | |
| 1,906,975 | 5/1933 | Larson | 239/297 |
| 1,910,673 | 5/1933 | Bramsen . | |
| 2,107,732 | 2/1938 | Gustafsson et al. | 239/290 |
| 2,393,346 | 1/1946 | Stroop | 239/526 |
| 2,473,667 | 6/1949 | Warner | 239/526 |
| 2,602,004 | 7/1952 | Faktor | 239/301 |
| 2,626,122 | 1/1953 | Lammiman . | |
| 2,708,095 | 5/1955 | Mitchell . | |
| 2,740,670 | 4/1956 | Harder . | |
| 2,786,716 | 3/1957 | Peeps | 239/301 |
| 3,037,709 | 6/1962 | Bok et al. . | |
| 3,314,646 | 4/1967 | Austin | 251/321 |
| 3,448,765 | 6/1969 | McKinney | 251/321 |
| 3,799,447 | 3/1974 | Beal | 239/288.5 |
| 4,176,793 | 12/1979 | Heinrich | 239/526 |
| 4,221,339 | 9/1980 | Yoshikawa . | |
| 4,286,734 | 9/1981 | Tonge | 239/526 |
| 4,334,637 | 6/1982 | Baker et al. | 239/600 |
| 4,531,675 | 7/1985 | Muck . | |
| 4,744,518 | 5/1988 | Toth | 239/297 |
| 4,776,517 | 10/1988 | Heren | 239/526 |
| 4,869,641 | 9/1989 | Hufgard . | |
| 4,905,905 | 3/1990 | Hufgard . | |
| 4,948,053 | 8/1990 | Hufgard . | |
| 4,993,642 | 2/1991 | Hufgard . | |

FOREIGN PATENT DOCUMENTS

| | | | |
|---|---|---|---|
| 222966 | 7/1959 | Australia . | |
| 753510 | 8/1944 | Fed. Rep. of Germany | 251/309 |
| 2606008 | 8/1977 | Fed. Rep. of Germany | 239/300 |
| 783021 | 7/1935 | France . | |
| 348141 | 5/1931 | United Kingdom | 239/300 |
| 496231 | 11/1938 | United Kingdom . | |
| 736131 | 8/1955 | United Kingdom . | |
| 2115112 | 9/1983 | United Kingdom | 251/309 |

*Primary Examiner*—Andres Kashnikow
*Assistant Examiner*—Christopher G. Trainor
*Attorney, Agent, or Firm*—Watts, Hoffmann, Fisher & Heinke

[57] ABSTRACT

An improved spray nozzle for use with air atomizable liquids wherein the spray pattern created by the atomizing nozzle may be adjusted from a circular pattern to a flat pattern or alternatively to an open oval. The open end faces in preselected directions. The adjustments are capable of occurring during the continuous operation of the nozzle.

31 Claims, 5 Drawing Sheets

10
13
74
56
28
34
30
54
12
3
24
30
3
74
32
26
20
4
62
SOURCE OF PAINT
27
74
56
10
14
54
15
SOURCE OF LOW PRESSURE HIGH VOLUME AIR 74
58
75
58
68
66
14
4

FIG. 4
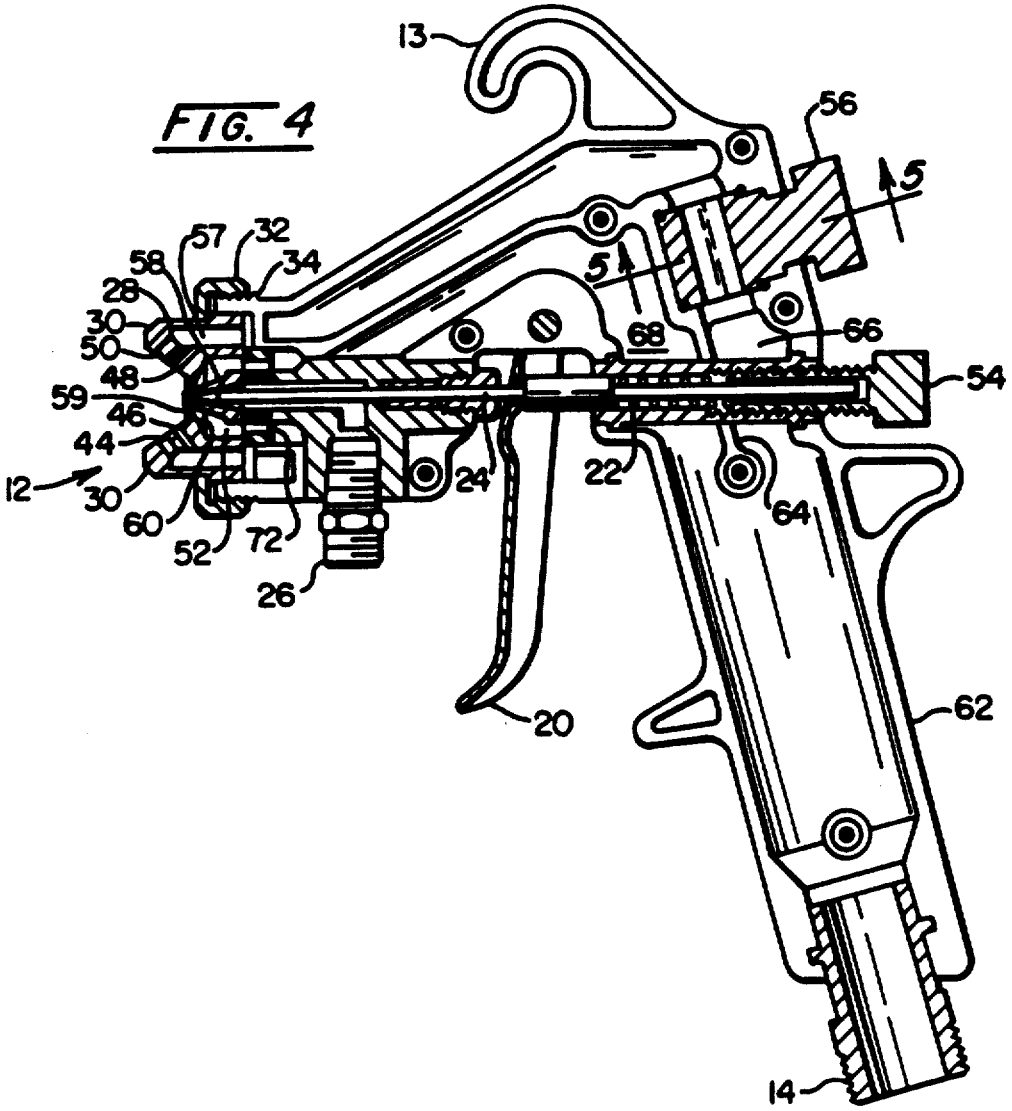
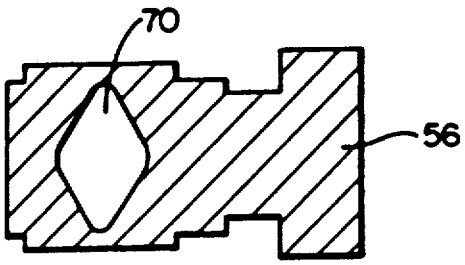
FIG. 5

13
10
9
76
90
9
SOURCE OF HIGH PRESSURE AIR 13
56
66
68
54
24
100
22
8
94
96
92
98
8
90
62

90
98
92
96
94

PAINT SPRAY GUN

Matter enclosed in heavy brackets [ ] appears in the original patent but forms no part of this reissue specification; matter printed in italics indicates the additions made by reissue.

This is a continuation-in-part of application Ser. No. 101,563 filed Sept. 28, 1987 *now U.S. Pat. No. 4,905,905*, still pending as of Nov. 28, 1989.

FIELD OF THE INVENTION

The invention relates to an improved paint spray gun and nozzle for adjusting the spray pattern using low pressure and high volume air for atomizing the paint and controlling the spray pattern.

BACKGROUND OF THE INVENTION

Spray guns and nozzles, especially those used with spray painting systems, atomize the liquid paint by means of atomizing air which enters the nozzle area via a chamber which surrounds a fluid nozzle. The atomizing air is then impinged on the end of the chamber and exits via a central aperture located at the end of the chamber. The paint is atomized by the accelerating burst of forward motion of this air as it exits the nozzle via the aperture. The initial conventional pattern of the atomized liquid and air mixture in cross-section is a circle because the exit aperture is circular.

The term pattern as used herein describes a cross-section of the atomized cloud of paint droplets in a plane perpendicular to the direction of the spray from the fluid nozzle. When the compressed air source for a spray painting apparatus utilizes a high volume, low pressure compressor, it is conventional for the air exit nozzle on the spray painting gun to have a central aperture which is considerably larger than the circumscribed liquid nozzle. Therefore, the large amount of air utilized in a conventional nozzle is due to the relative size of the central aperture compared to that of the liquid nozzle. This excess air, air beyond that required to atomize the liquid properly, constitutes an energy waste as well as a pollution problem. The excess air is a pollution problem since the air in a paint system will tend to carry the paint solvent. The more air that is used, the more dilute the solvent, and the more air that must be processed for the removal of solvents.

Therefore, there is a need for an improved spray nozzle which more efficiently utilizes the air that it actually receives from the air source.

The pattern of a spray nozzle is conventionally adjusted by impinging additional air jets into the original circular pattern at a location beyond the outlet aperture. A standard design may include two oppositely directed jets which produce a flat or oval pattern, and if those jets are very powerful it produces a flat fan type spray pattern which is many times wider than it is high. However, in production line spraying, there are needs for other than such flat or oval patterns, especially when spray painting the reverse sides of objects or spray painting in an out-of-position way and also the traditional problem of painting the insides of angular surfaces.

Therefore, there is also a need for improved pattern control in spray nozzle systems and the ability to adjust the pattern to other than flat or oval pattern. It would additionally be desirable if such adjustments or modifications of the pattern could be achieved without the necessity of changing the nozzle in use.

Another problem with spray guns is that the air from the compressor is hot and tends to heat metal parts in the flow path to an extent that hand held spray guns may burn the operator or at least make his hand most uncomfortable.

SUMMARY OF THE INVENTION

An improved spray gun according to this invention includes an atomizing chamber with a central aperture for the exit of atomized liquid spray. The chamber has a converging frusto-conical surface approaching the aperture that acts to direct and streamline the atomizing air.

A fluid nozzle is mounted concentrically with the aperture and the exterior surface is structured to further direct atomizing air through the aperture in streamline flow as opposed to turbulent flow.

Another aspect of the present invention is a pattern adjusting plug valve which adjusts air flow to the pattern adjusting nozzles which may be directed at the atomized liquid spray.

The shell of the gun is molded from a resin in two mirror image halves which are bolted together. The resin will serve as an insulator because it is a poor heat conductor.

Objects of the invention which are not obvious from the above will be clear from a review of the drawing and the description of the preferred embodiments which follow.

BRIEF DESCRIPTION OF THE DRAWINGS

The best mode contemplated in carrying out this invention is illustrated in the accompanying drawings in which:

FIG. 4 is a cross-sectional view taken along line 4—4 of the gun of FIG. 2;

FIG. 5 is a cross-sectional view taken along line 5—5 of the gun of FIG. 4;

DESCRIPTION OF THE PREFERRED EMBODIMENTS

Figures 1, 2, 3:
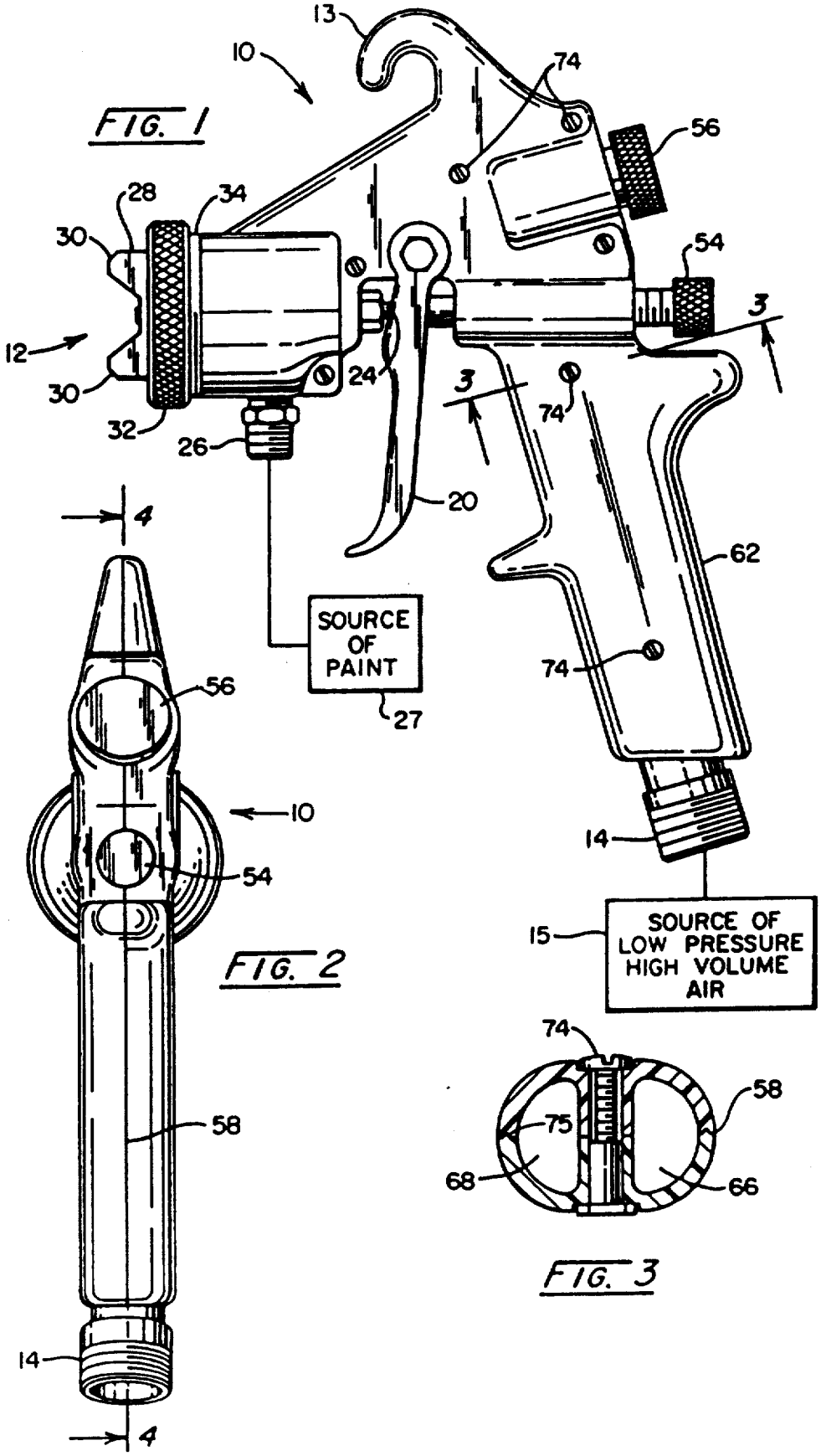
FIG. 1 is an elevational view of a paint spray assembly utilizing a nozzle according to the present invention.
FIG. 2 is a right hand side elevational view of the gun of FIG. 1.
FIG. 3 is a cross-sectional view taken along line 3—3 of the gun of FIG. 1.

With reference to the drawings, FIG. 1 shows a paint spray gun 10 which utilizes a nozzle 12 according to the present invention. Any conventional spray painting gun has a pistol grip type handle on the body 10 and can optionally have a hook assembly 13 for hanging the gun after work has been completed or for temporary storage.

An air supply fitting 14 provides a connection to a source 15 of low pressure, constant high volume compressed air to the spray painting assembly. Within the body of the spray gun 10 the air supply is directed along a path to an air chamber adjacent a paint nozzle as will be explained subsequently.

The paint gun body 10 also has a trigger assembly 20 which is held in its closed position by a spring 22 in the base of the handle. Additionally a pull rod 24 is moved by the trigger assembly, pull rod 24 serving to adjust the flow rate of paint to the nozzle tip while paint supply fitting 26 provides direct access to the supply of paint 27.

On the forward end of the body 10 is a nozzle or air cap 28 having a pair of forwardly projecting ears 30, best seen in FIG. 4. The cap 28 is mounted in operative position on body 10 and secured in place by a collar 32 threadedly engaging external threads 34 on the body.

Turning now to FIG. 4, within the concave nozzle ear faces are pattern adjusting orifices 44, 46, 48, 50 in fluid communication with an air passage 57.

FIG. 2 shows the right-hand side elevational view of the gun of FIG. 1. A knob 54 may be rotated to adjust the compression of spring 22 as desired. A plug valve 56 may be adjusted manually to control the flow of air to pattern adjusting ears 30 as will be explained in more detail subsequently. Line 58 is split between the two halves forming the body of gun 10.

The body of the gun itself is formed of two molded pieces which are mirror images of each other. The pieces are formed from Ryton brand resin, polyphenylene sulfide, in the preferred embodiment but other suitable resins may be used. Any appropriate resin should be a low conductor of heat to protect the hand of an operator from heat in the compressed air from the turbine (up to 180° F.). Additionally, the resin should be easy to mold into the illustrated shape and solvent proof to prevent deterioration from paint solvents or airborne solvents in the atomized air.

A cross-section of the spray nozzle assembly is shown in FIG. 4. In this view atomizing air chamber 52 serves as a plenum chamber and is shown with liquid nozzle valve 58 penetrating it, atomizing air chamber 52 having a central aperture 59 located at its outlet end. It will be noted that the central aperture 59 has an upstream converging frusto-conical shaped surface 60. Preferably the frustoconical shaped surface 60 has a slope not corresponding to the converging conical end of liquid nozzle valve 58, that is, the angle subtended by the cone shaped surface 58 is less than the angle formed by surface 60. The reason is to have better control of the flow pattern.

As best seen in FIG. 4, air moves from fitting 14 through the handle 62 into passage 57 by flowing through plug valve 56. A barrier 64 divides the air passing through fitting 14 and handle 62 into two paths 66 and 68. Flow through path 66 is regulated by plug valve 56. Valve 56 may be rotated from full open to full closed position. The full open position will allow air to flow from the gun through orifices 44, 46, 48 and 50 to compress the paint spray from aperture 59 and form a flat fan shaped spray pattern. The full closed position will result in a circular spray pattern.

Note the diamond shaped opening 70 of FIG. 5 through plug valve 56. It receives air from the oval shaped duct 66 and allows for easy hand manipulation of valve 56 to adjust the orifice flow with only a small angle of rotation. Conventional O-rings around the plug valve minimize air leaks. Alternatively, the duct 66 may be diamond shaped and the opening 70 could be oval in cross-section.

Figure 4A:
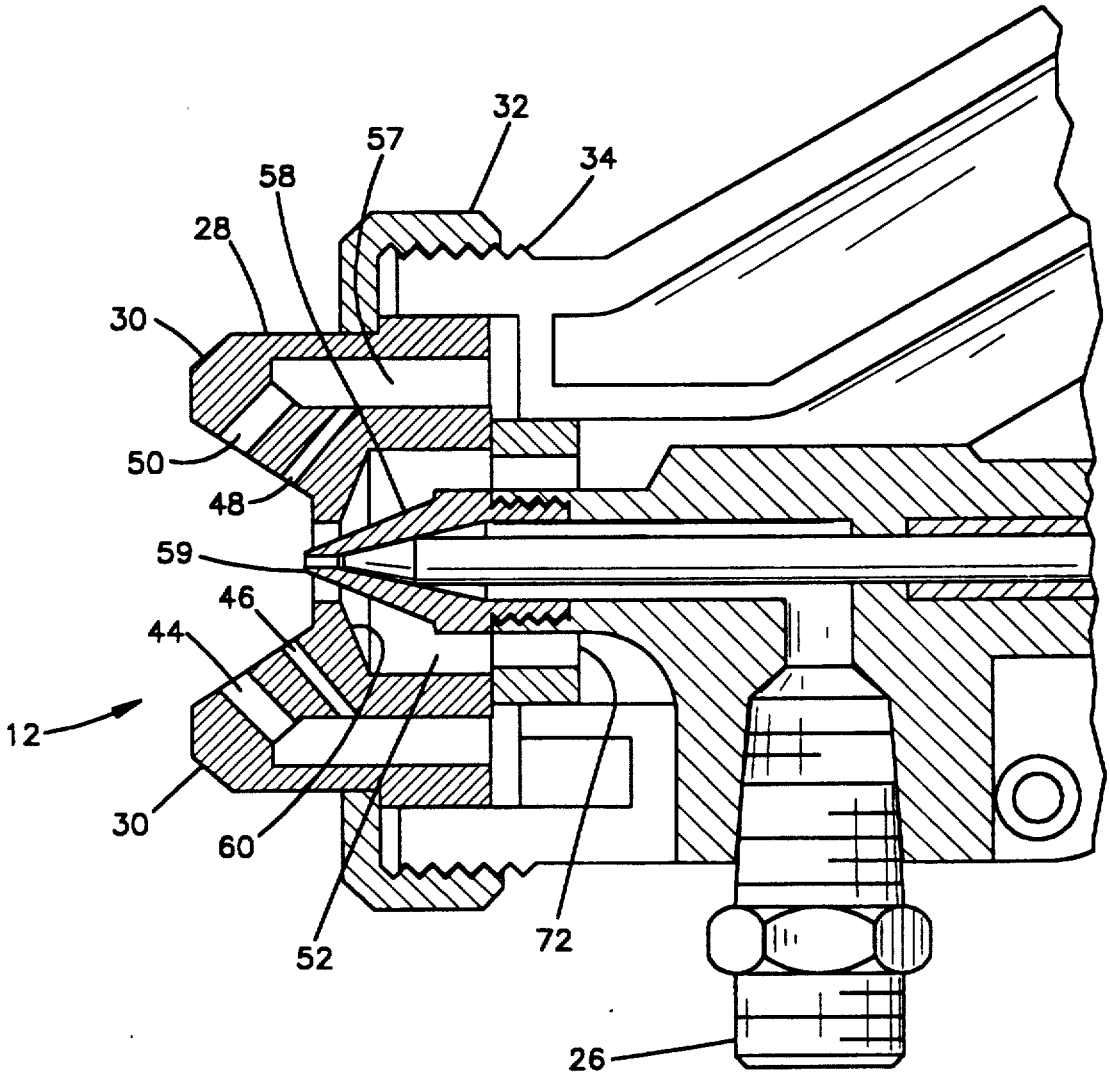
*FIG. 4A is an enlarged view of a portion of the gun illustrated in FIG. 4;*

Flow through paths 68 leads through opening 72 in a radial flange around nozzle 58 (*FIG. 4A*), upstream of air chamber 52. Flow into air chamber 52 dampens flow turbulence by virtue of its increased cross-sectional area downstream of opening 72 (as illustrated in FIG. 4) to insure laminar flow of air through aperture 59. Laminar flow is desirable because it maintains a more uniform spray pattern at greater distances from aperture 59.

Note should be taken of the relatively large flow paths 66 and 68 (about 0.25 in.×0.5 in. oval cross-section for each, see FIG. 3) and the relatively gently curving path. This is necessary because of the desirability for high volume (about 5–60 cfm) and relatively low pressure (less than about 10 psig). Conventional compressor pressures are in the range 30–80 psig.

It is because of the low pressure utilized and the design of the interior of the gun that the gun may be formed of two molded resin halves held together by a plurality of screw combinations 74, best illustrated in FIG. 3. With conventional air pressures the gun would leak like a sieve because it would bulge outwardly. Note the mating tongue-in-groove structure 75 in FIG. 3 to help minimize leaks.

Figure 6:
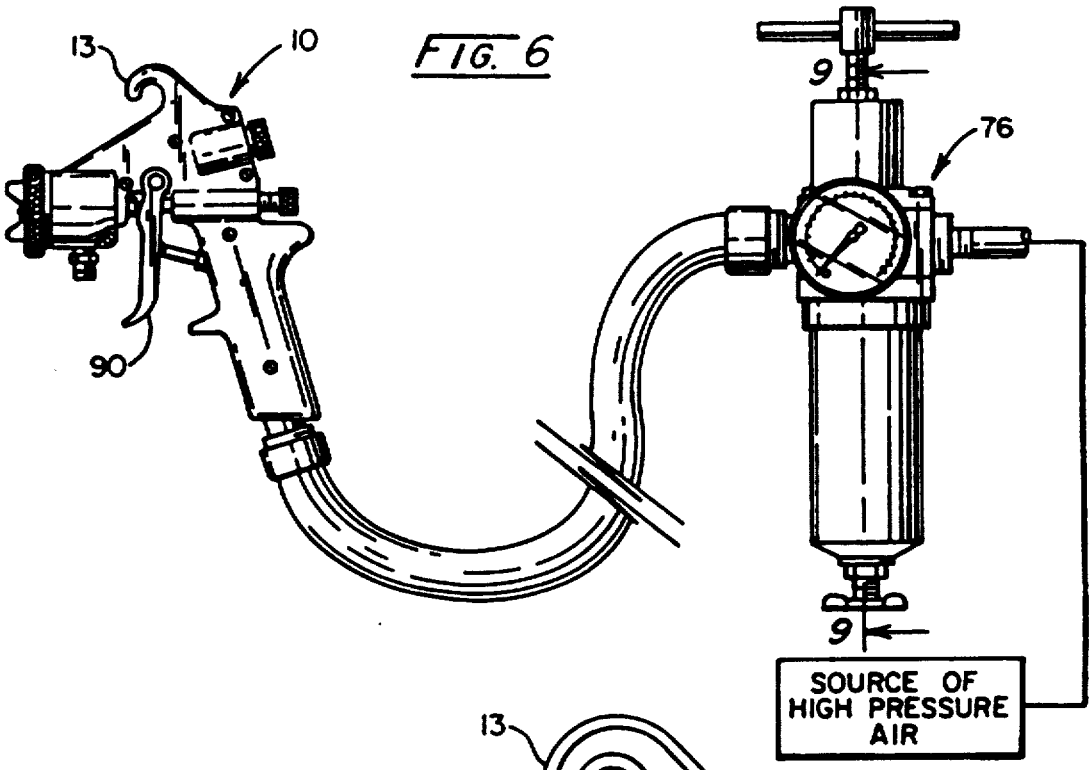
FIG. 6 is an elevational view of a first alternative form of gun supplied by a source of high pressure air.
Figure 7:
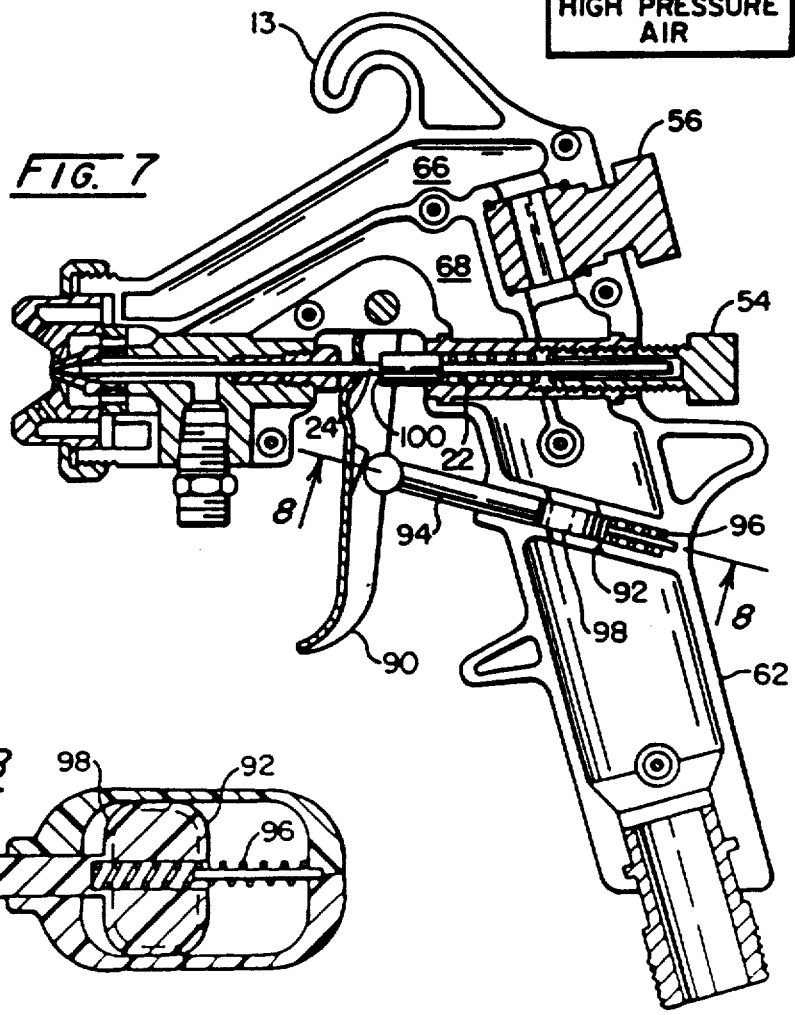
FIG. 7 is a sectional view similar to FIG. 4 but illustrating the alternative form of gun shown in FIG. 6.
Figure 8:
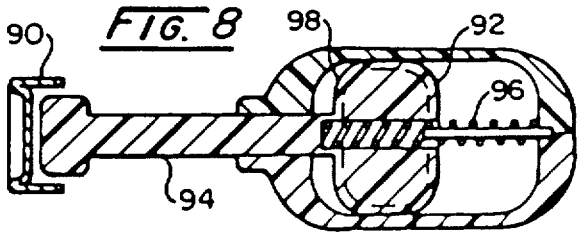
FIG. 8 is a sectional view taken along line 8—8 of FIG. 7.

An alternative embodiment of the gun is illustrated in FIGS. 6 and 7. The difference is that the gun 10 is supplied from a convention source of high pressure air. A combination filter and pressure reducer valve 76 is designed to receive air at a pressure in the range 30–80 psig and 30–60 standard cfm and delivery the same 30–60 standard cfm at less than 10 psig.

Figure 9:
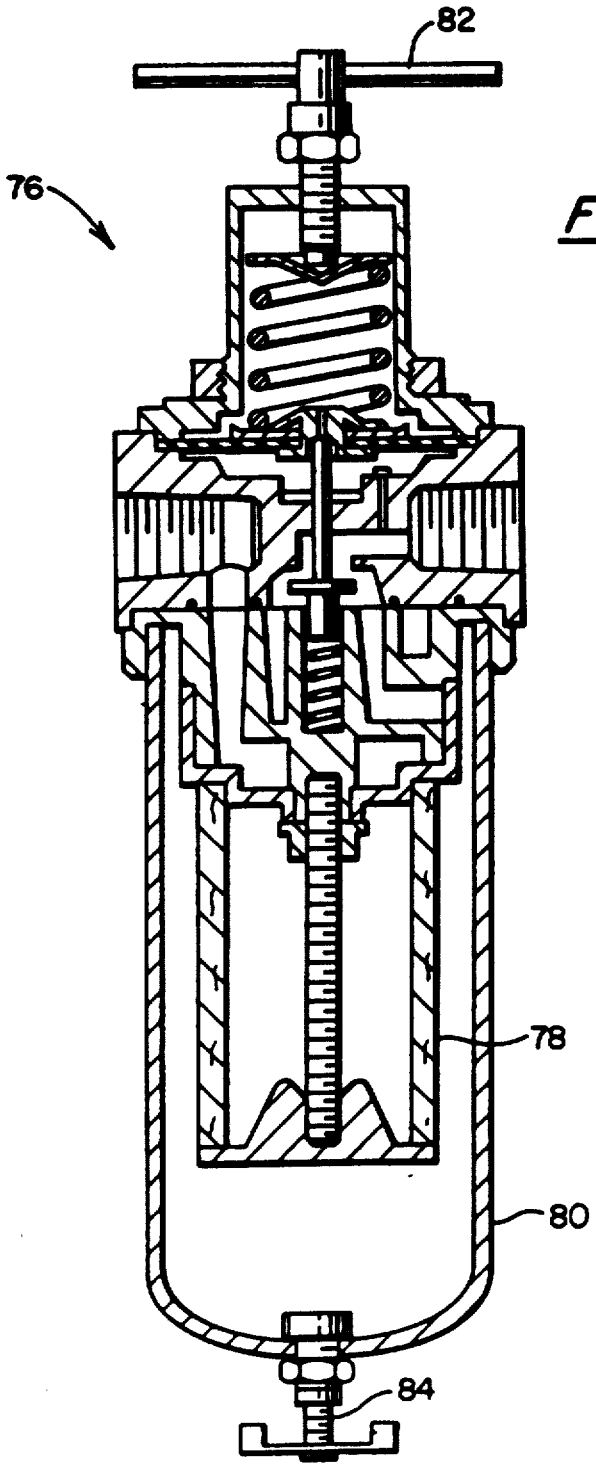
FIG. 9 is a sectional view taken along line 9—9 of FIG. 6.

FIG. 9 shows the internal structure of filter-valve 76 and includes a filter 78 inside a sediment bowl 80. Air will pass through the filter and any liquid droplets or solid particles will be retained in bowl 80. A T-handle 82 allows the operator to adjust the outlet pressure as desired. A drain valve 84 allows liquid to be drained from the bowl 80 periodically. Appropriate seals and connecting thimbles and screws threads are illustrated but not specifically described because their function appears self evident.

Another difference illustrated in FIG. 7 is the trigger mechanism 90. In FIG. 4 the flow of air is continuous, the only adjustment possible from fitting 14 to cap 28 is the plug valve 56 controlling flow through duct 66. In FIG. 4 the trigger assembly serves only to open and close the needle valve to stop, start, and adjust the flow of paint from source 27. In the embodiment of FIG. 7 the trigger assembly 90 is designed to open and close a port 92 in the handle by a rod 94 which works against a spring 96.

In operation in FIG. 7 an operator will squeeze the trigger 90 to depress springs 22 and 96. Note that blocking plate 98 which blocks port 92 is the first to move to initiate air flow to the nozzle area through duct 68 prior to the time the trigger engages the abutment 100 on rod 24. Thereby air will begin flowing from the nozzle before paint flow starts. Whether or not air flows through duct 66 when plate 98 opens port 92 is separately controlled by plug valve 56.

Having thus described this invention in its preferred embodiment, it will be clear that modifications may be made to the structure without departing from the spirit of the invention.

I claim:

1. A spray gun for use with air atomizable liquid comprising;

means forming an air chamber having an outlet end;

a liquid nozzle valve having a conical taper penetrating said air chamber and extending to and coaxially aligned with a central circular aperture in the outlet end of said air chamber;

means for delivering a liquid to said central aperture for atomization by air exiting said air chamber through said central aperture;

at least two pattern adjusting nozzles disposed adjacent to the central aperture of said air chamber;

means for conducting air to said chamber and separate means for conducting air to said nozzles;

means for adjusting the flow rate of air to said nozzles; and the outlet end of said air chamber having a converging down stream frusto-conical shape which terminates at said central aperture, said liquid nozzle valve including external means combined with said frusto-conical shape for providing an increasing down stream cross-sectional area in said air chamber toward said frusto-conical shape;

said gun being formed as parts bolted together, said parts having internal passages which are mirror images of each other, said passages comprising said air conducting means extending from an air inlet into said gun to said chamber and said nozzles, and when said parts are bolted together said passages combined to form paths for air delivered to said air inlet from an air source connected to said gun, there being no additional passage means in said gun for conducting said air to said air chamber and said pattern adjusting nozzles.

2. The gun according to claim 1 wherein each pattern adjusting nozzle is located in a nozzle ear which projects beyond the plane of said central aperture.

3. The gun according to claim 2 wherein said adjusting means includes a rotable valve in said separate air conducting means.

4. The gun according to claim 3 wherein said two pattern adjusting nozzles are located at diagonally opposite sides of said central aperture.

5. The gun according to claim 1 wherein said adjusting means includes a rotable valve in said separate air conducting means.

6. The gun according to claim 1 wherein the means for adjusting the flow rate of air to the pattern adjusting nozzles comprises a rotable valve in said passage leading to said nozzles and configured to selectively open, close and partially open said passage to receive air from said source.

7. The gun according to claim 1 wherein said two pattern adjusting nozzles are located on diagonally opposite sides of said central aperture.

8. The gun according to claim 7 wherein the means for adjusting the flow rate of air to the pattern adjusting nozzles comprises a rotable valve in said passage leading to said nozzles and configured to selectively open, close and partially open said passage means to receive air from said source.

9. The gun according to claim 2 wherein the means for adjusting the flow rate of air to the pattern adjusting nozzles comprises a rotable valve in said passage leading to said nozzles and configured to selectively open, close and partially open said passage to receive air from said source.

10. The gun of claim 1 wherein said parts are formed from the thermoplastic resin.

11. The gun of claim 10 wherein said resin has the physical characteristics of:

(a) low heat conducting as compared to metals, (b) easy moldability, and (c) low solubility to paint solvents.

12. The gun of claim 11 wherein the resin is polyphenylene sulfide.

13. The gun of claim 12 wherein said flow paths are generally oval-shaped with dimensions of about ¼ in. × ½ in.

14. The gun of claim 13 wherein the source of air delivered to said paths is at a pressure in the range not substantially greater than about 10 psig. and a volume of about 5–60 cfm.

*15. A spray gun for use with air atomizable liquid comprising:*

*a. a gun body forming a manually grippable handle and a spray directing section projecting from said handle;*

*b. a liquid flow controlling valve supported by said gun body in said spray directing section;*

*c. a chamber defined within said gun body spray directing section and an aperture defined in a wall of said chamber through which liquid and atomizing air may be directed;*

*d. liquid directing means for introducing liquid from a liquid supply to said liquid flow controlling valve;*

*e. air directing means for introducing air under pressure from an air supply to said chamber, said air directing means comprising a passage through which air flows to said chamber;*

*f. said liquid flow controlling valve disposed at least partly in said chamber, liquid from said valve and air from said chamber interacting so that liquid is atomized and air and atomized liquid are sprayed away from said aperture; and,*

*g. trigger means for governing operation of said liquid flow controlling valve to initiate and terminate an atomized liquid spray;*

*h. said gun body comprising first and second body parts each defining a portion of said handle and spray directing section, each body part defining:*

*i. a liquid flow controlling valve engaging structure;*

*ii. trigger means engaging structure; and,*

*iii. an air passage wall section; and,* i. connector means for detachably clamping said body parts in an assembled condition with said liquid flow controlling valve and said trigger means secured in position relative to each other, said air passage wall sections hermetically secured in place when said body parts are clamped, said connector means operable to detach the gun body parts for enabling access to said liquid flow controlling valve, said air directing means and said trigger means.

*16. The spray gun claimed in claim 15 wherein said air directing means further comprises a pressure fitting by which pressurized air is delivered from the air supply to the passage, said fitting engaged and supported by said gun body parts.*

*17. The spray gun claimed in claim 16 wherein said pressure fitting is disposed in said handle remote from said aperture and said passage extends from said fitting to said chamber.*

*18. The spray gun claimed in claim 15 further comprising spray pattern adjusting means for directing streams of air into said spray for changing the spray configuration, said spray pattern adjusting means supplied with air from said air passage.*

*19. The spray gun claimed in claim 18 further comprising a flow path branching from said air passage for delivering air to said pattern adjusting means, each said gun body part defining a flow path wall section, said flow path wall sections hermetically secured in place when said body parts are clamped.*

*20. The spray gun claimed in claim 18 further comprising an air flow controlling valve disposed in said flow path for adjustably controlling the flow rate of air to said pattern adjusting means, said air flow controlling valve engaged and supported by respective retaining surfaces of said body parts when said body parts are clamped.*

*21. The spray gun claimed in claim 20 wherein said air flow controlling valve is linked to said trigger means so that said pattern adjusting means operates when said liquid valve operates.*

*22. The spray gun claimed in claim 18 wherein each of said gun body parts is molded to define said passage and flow path wall sections, said flow path branching from said passage at a location remote from said chamber, said molded wall sections of said passage and said flow path directing air flow therethrough with relatively low turbulence.*

*23. The spray gun claimed in claim 15 further comprising an air flow controlling valve disposed in said passage for initiating and interrupting the flow of air to said chamber, said air flow controlling valve hermetically clamped between said gun body parts.*

*24. The spray gun claimed in claim 15 wherein said gun body parts are clamped directly into engagement with each other to define said passage, said parts defining mating tongue and groove sealing elements which are sealingly engaged when said body parts are clamped.*

*25. The spray gun claimed in claim 15 wherein said connector means comprises a collar member threaded onto said body parts at said spray directing section, said body parts defining coextending portions having coordinated threaded surfaces for receiving said collar.*

*26. The spray gun claimed in claim 25 wherein said chamber wall is defined by a cap-like member extending about said coextending body portions, said aperture defined in said cap-like member and said collar retaining said cap-like member in position.*

*27. A spray gun for use with an air atomizable liquid, comprising a body with handle and spray directing sections and passages therethrough for the flow of atomizing air, pattern adjusting air and liquid, the atomizing air and liquid discharged through an aperture in the spray directing section, and a trigger for controlling the liquid flow, said body comprising separate body parts and connector means for detachably clamping said body parts together, each body part forming part of each air passage so that when said body parts are clamped together they form said passages, said clamped body parts providing structure for receiving air and liquid supply connections.*

*28. A spray gun according to claim 27, characterized by the fact that the passage sections of the body parts are hermetically sealed.*

*29. A spray gun according to claim 27, characterized by the provision of a control valve for governing the passage of the pattern-adjusting air.*

*30. A spray gun according to claim 27, characterized by the fact that the trigger is linked to means for controlling the flow of air.*

*31. A spray gun according to claim 27, characterized by the fact that the body parts are made of thermoplastic resin.*

* * * * *